(12) United States Patent
Iizumi et al.

(10) Patent No.: US 11,237,342 B2
(45) Date of Patent: Feb. 1, 2022

(54) ADJUSTABLE POLARITY FIBER OPTIC CONNECTOR ASSEMBLY WITH SHORTENED ROTATABLE BOOT ASSEMBLY

(71) Applicants: Senko Advanced Components, Inc., Marlborough, MA (US); Sumitomo Electric Industries, Ltd., Osaka (JP)

(72) Inventors: Kenji Iizumi, Tokyo (JP); Kazuyoshi Takano, Tokyo (JP); Yohei Aoshima, Osaka (JP); Daizo Nishioka, Osaka (JP); Man Ming Ho, Kowloon (HK)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/456,039

(22) Filed: Jun. 28, 2019

(65) Prior Publication Data

US 2020/0003963 A1    Jan. 2, 2020

Related U.S. Application Data

(60) Provisional application No. 62/691,463, filed on Jun. 28, 2018.

(51) Int. Cl.
*G02B 6/38* (2006.01)

(52) U.S. Cl.
CPC ......... *G02B 6/3871* (2013.01); *G02B 6/3887* (2013.01); *G02B 6/3893* (2013.01)

(58) Field of Classification Search
CPC .... G02B 6/3871; G02B 6/3887; G02B 6/389; G02B 6/3891; G02B 6/3893
See application file for complete search history.

(56) References Cited

U.S. PATENT DOCUMENTS

| 7,234,879 | B2 | 6/2007 | Schrodinger |
| 9,971,102 | B2 * | 5/2018 | Raven ................. G02B 6/3831 |
| 10,620,384 | B2 * | 4/2020 | Iizumi ................. G02B 6/3831 |
| 10,795,094 | B2 * | 10/2020 | Lee ...................... G02B 6/3871 |
| 2003/0091295 | A1 | 5/2003 | Cheng |
| 2010/0220961 | A1 | 9/2010 | De Jong et al. |
| 2014/0169727 | A1 | 6/2014 | Veatch et al. |

(Continued)

FOREIGN PATENT DOCUMENTS

| EP | 1916552 A1 | 9/2007 |
| EP | 1916552 A1 | 4/2008 |

OTHER PUBLICATIONS

International Search Report and Written Opinion, Application No. PCT/US19/46397, dated Nov. 12, 2019, pp. 6.

(Continued)

*Primary Examiner* — Thomas A Hollweg
*Assistant Examiner* — Mary A El-Shammaa

(57) ABSTRACT

A fiber optic connector with a rotatable housing integrated with a connection member for converting the connector from a first polarity to a second polarity, and a manipulator assembly comprising the rotatable housing and a locking member movable between a locked position and an unlocked position, the manipulator assembly being coupled to the connection member such that the manipulator assembly and the connection member rotate conjointly about the axis of rotation, and when in locked position connector polarity cannot be changed.

7 Claims, 12 Drawing Sheets

(56) References Cited

U.S. PATENT DOCUMENTS

| | | |
|---|---|---|
| 2015/0277059 A1 | 10/2015 | Raven et al. |
| 2016/0047993 A1 | 2/2016 | Hioki et al. |
| 2016/0216458 A1 | 7/2016 | Shih |
| 2016/0349458 A1 | 12/2016 | Murray et al. |
| 2017/0205587 A1 | 7/2017 | Chang et al. |
| 2017/0293090 A1 | 10/2017 | Hopper et al. |
| 2018/0088288 A1 | 3/2018 | Taira et al. |
| 2019/0004251 A1* | 1/2019 | Dannoux .............. G02B 6/3893 |
| 2019/0004258 A1* | 1/2019 | Dannoux .............. G02B 6/3873 |
| 2019/0219775 A1* | 7/2019 | Iizumi .................. G02B 6/387 |
| 2019/0353852 A1* | 11/2019 | Lee ...................... G02B 6/3825 |
| 2020/0200979 A1* | 6/2020 | Iizumi .................. G02B 6/3857 |

OTHER PUBLICATIONS

International Search Report and Written Opinion for Application No. PCT/US2019/039729 dated Dec. 13, 2019, pp. 5.

* cited by examiner

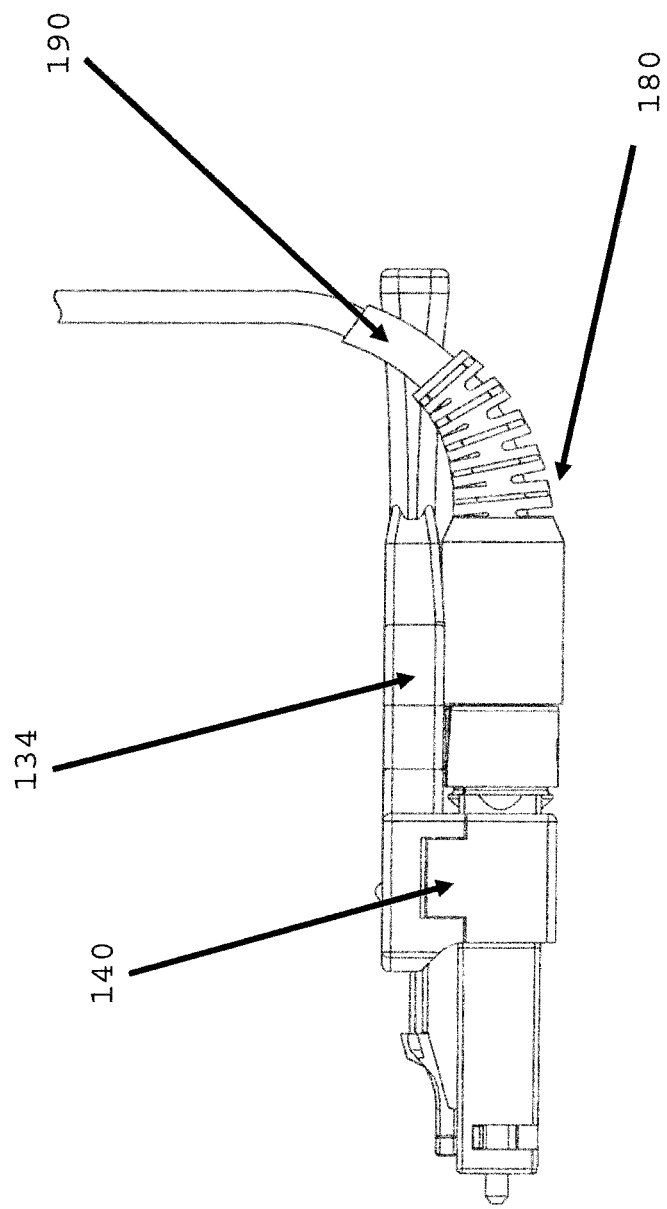

ADJUSTABLE POLARITY FIBER OPTIC CONNECTOR ASSEMBLY WITH SHORTENED ROTATABLE BOOT ASSEMBLY

CROSS REFERENCE TO RELATED APPLICATIONS

The present application claim priority to U.S. Patent Application 62/691,463 entitled "Adjustable Polarity Fiber Optic Connector Assembly with Push-Pull Tabs", filed on Jun. 28, 2018, and the applications above are incorporated by reference into the present application.

BACKGROUND OF THE INVENTION

The present disclosure relates generally to fiber optic connectors. The prevalence of the Internet has led to unprecedented growth in communication networks. Consumer demands for service and increased competition has caused network providers to continuously find ways to improve quality of service while reducing cost. Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. A cable assembly is formed from a cable boot and fiber optic cable or cable. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

Accordingly, there is a need for fiber optic connectors that will meet the needs of future developments allowing for smaller footprints, easier implementation, and easy field modification.

BRIEF SUMMARY OF THE INVENTION

This disclosure is not limited to the particular systems, devices and methods described, as these may vary. The terminology used in the description is for the purpose of describing the particular versions or embodiments only, and is not intended to limit the scope.

The invention generally relates to a fiber optic connector having one or more ferrules. The connector housing has a front end and a back end, and the housing is configured to accept and secure the one or more ferrule within the housing. The one or more ferrule is partially exposed through the front end. The ferrule makes an optical connection to an opposing fiber optic connector inserted into a second side of the receiver.

The connector has a connection member that is configured to interlock with a locking feature formed as part of the receiver, which locks the optical fiber connector into the receiver. The non-limiting improvement is the connection member can be rotated about the connector body. The connection member is coupled to a manipulator assembly, which aids in the removal of the connector from the transceiver. The connection member and manipulator assembly are also coupled together, so both rotate about the connector axis of rotation AR-AR'. The connector axis extends from the exposed ferrule to a cable boot. The rotation is respect to the connector housing about an axis of rotation from a first polarity orientation to a second polarity orientation.

The manipulator assembly has a pull tab which is integrated with a rotatable housing. The rotatable housing has a first locking member and the first locking member is movable relative to the rotatable housing between a locked position and an unlocked position, with a second locking member. The second locking member and first locking member are hinged together with a locking tab and opening to lock the members together, which prevents rotation of the rotatable housing. The manipulator assembly is coupled to the connection member via connection arms, such that the manipulator assembly and the connection member rotate conjointly about the axis of rotation.

The manipulator assembly is further configured to prevent rotation of the manipulator assembly with respect to the connector housing when the first locking member is in the locked position, and the manipulator assembly can rotate relative to the housing about the axis of rotation when the first locking member is in the unlocked position with the second locking member. The rotatable housing does not extend beyond an upper body portion of a cable boot.

BRIEF DESCRIPTION OF THE SEVERAL VIEWS OF THE DRAWING

The above and other objects of the present invention will become more readily apparent from the following detailed description taken in connection with the accompanying drawings.

FIG. 12 depicts movement of flexible boot deploying FIG. 3 embodiment of the present invention.

Corresponding reference characters indicate corresponding parts throughout the several views of the drawings.

DETAILED DESCRIPTION OF THE INVENTION

Figure 1:
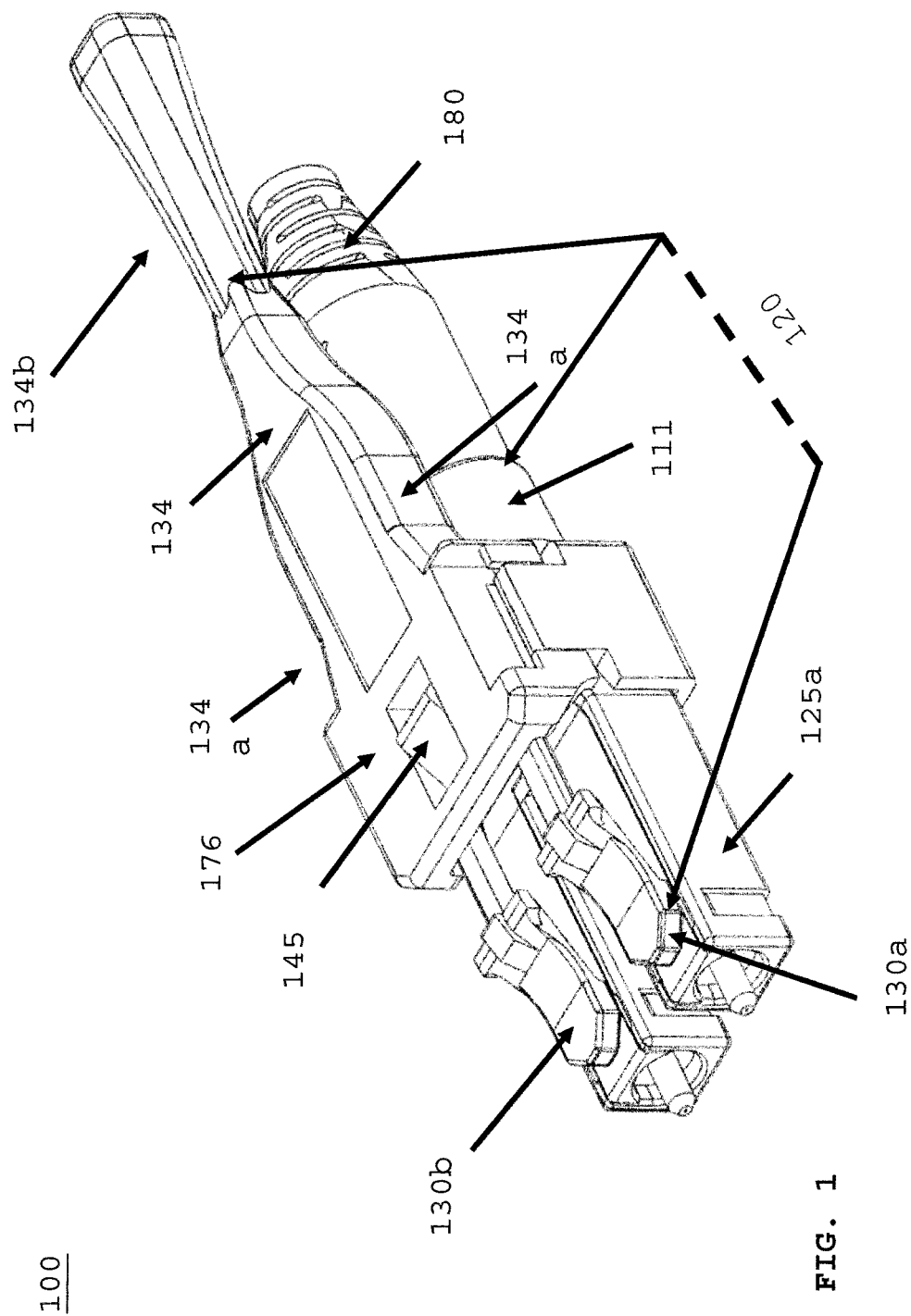
FIG. 1 depicts a perspective view of a connector assembly with a push-pull tab.

The reliability of communication infrastructure depends on secure and accurate connections between components, such as cable segments, cable assemblies, network equipment, and communication devices. Large-scale data communication systems use fiber optic cables for data transmission between components. The fiber optic cables may be terminated by connector assemblies. Duplex connector assemblies, such as an LC connector assembly, may include a receiving optical fiber and a transmitting optical fiber. Such duplex connector assemblies may connect with an adapter having corresponding receiving and transmitting ports. A duplex connector assembly is generally configured such that the receiving optical fiber connects with the transmitting port of the adapter and the transmitting optical fiber connects with the receiving port of the adapter.

A duplex connector assembly has a polarity based on the relative orientation of the receiving optical fiber and the transmitting optical fiber. Similarly, a corresponding adapter may have a polarity based on the relative orientation of the receiving port and the transmitting port. If the polarity of the connector assembly corresponds to the polarity of the adapter, the connection between the connector assembly and the adapter may successfully communicate data over the fiber optic cables joined by these two components. However, particularly in large installations, the polarity of the connector often does not correspond with the polarity of the adapter, leading to cross over and other communication issues. The connector assembly cannot simply be rotated to a correct polarity, as the connector assembly includes elements configured to secure the connector assembly to the adapter which prevent rotation.

Conventional techniques for changing an incorrect polarity of a connector assembly involve difficult and time consuming methods. For example, an installer may be required to remove the existing, incorrect connector assembly and prepare a new connector assembly on site. Other methods involve the use of special tools or high-cost connector components that may also require twisting or rotating the fiber, which may lead to damaged connections. Accordingly, telecommunication network providers would benefit from a connector assembly configured to allow for the efficient and effective changing of the polarity of the connector assembly on-site.

The described technology generally relates to connector assemblies (for example, a plug, male connector, connector, or the like) having an adjustable polarity. In general, the connector assemblies have a plurality of orientations, alignments, or other physical attributes that cause the connector assemblies to have a plurality of polarities. In some embodiments, the connector assembly may only fit into and/or correctly connect with an adapter (for instance, a receptacle, female connector, adapter, or the like) in one or more of the polarities. The polarity of the connector assembly may be based on the relative orientation of components of the connector assembly, such as ferrules, a housing, a latch, a frame, or the like. For example, a connector assembly configured according to some embodiments may include two ferrules, a transmission ferrule and a receiving ferrule that may be arranged in one of a first polarity and a second polarity in order to form a successful connection with a corresponding adapter.

The connector assemblies and other data transmission elements described according to some embodiments herein may be connected within a network, which may include any type of network capable of transmitting signals, electricity, or any other type of transmission medium. For instance, the network may include, without limitation, a communication network, a telecommunication network, an electrical network, a data network, a computer network, and any combination thereof. In some embodiments, the network may include a communication network using various signal transmission mediums, including, without limitation, fiber optic networks, Ethernet networks, cable and/or satellite television networks, and any other type of communication network now known or developed in the future. In some embodiments, the sealable connector assemblies may be configured to connect cable segments and/or devices within a fiber optic network using various standard connector types and/or adaptors, including, but not limited to, LC, ST, SC, FC, DIN, D4, SMA, E2000, Biconic, FullAXS, OCD, small form-factor pluggable (SFP), MPO and/or copper-type network connections, such as RJ-45 type connectors. In some embodiments, the connector assembly may include a duplex LC-type connector and the connector assembly adaptor may include an SFP adaptor. In some embodiments the connector assembly may include a LC-type uniboot connector. In some embodiments, the connector assembly may include a unibody connector, for instance, that includes a round fiber optic cable.

FIG. 1 depicts a perspective view of a connector assembly with a push-pull tab 134. As shown in FIG. 1, connector assembly 100 may include plug frame 125a that houses a ferrule assembly and positioned on top of the plug frame is connection member (130a, 130b). Pull-push tab 134 includes second locking member 176 and narrowed neck 134a, the latter for reducing the profile of push-pull tab 134 to be similar to the outer dimensions of flexible cable boot 180. Push-pull tab 134 includes a window or opening 135 (FIG. 3) that protrusion 145 extends through. Protrusion 145 can be pressed down to release connector assembly from a receiver as described below. Push-pull tab 134 has an extended arm 134b, as is known in the art. Extended arm 134b may become tangled up or with fiber optic cable or cable 190 extending from cable boot 180. When connectors are inserted side by side or top and bottom or similar configurations, cable 190 (FIG. 3) become crossed with each other as each cable may come from a different place. Extended arm 134b may get in the way when rotating manipulator assembly 120. Manipulator assembly includes rotatable housing 115 (improvement in the present invention) or push/pull tab 134 used to activate connector members (130a, 130b) that are interconnected by connection member arms (147a, 147b) as described below. Assembly 120 is further configured to rotate about a fiber optic connector housing 110, as described below. Assembly 120 further includes a protrusion 145 to release the optical connector from a receiver (not shown). The receiver is well known in the prior art as an adapter port.

Figure 2:
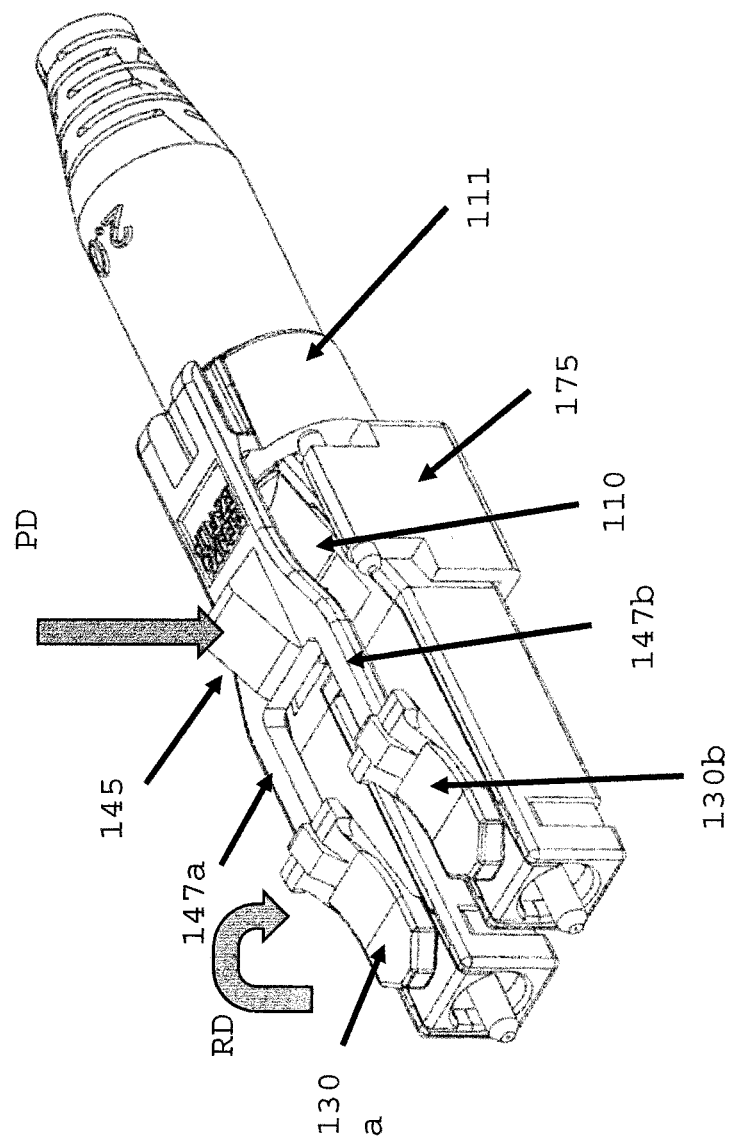
FIG. 2 depicts FIG. 1 without push-pull tab.

FIG. 2 depicts FIG. 1 without push/pull tab 134. Connection members (130a, 130b) are interconnected with protrusion 145 along connection member arms (147a, 147b) respectively. Distal end or opposite end from connection members, collar 111 is integrated with connection member arms (147a, 147b). In operation, user can rotate locking members in direction of arrow (FIG. 9) as described herein to change polarity of connector assembly (100, 200), as arms are integrated via collar 111. Also a user can depress protrusion 145 downward in direction of arrow "PD" to release connection members (130a, 130b) from a receiver not shown thereby releasing the connector assembly from receiver. This rotates down in direction of arrow "RD", connector members thereby releasing from the receiver.

Figure 3:
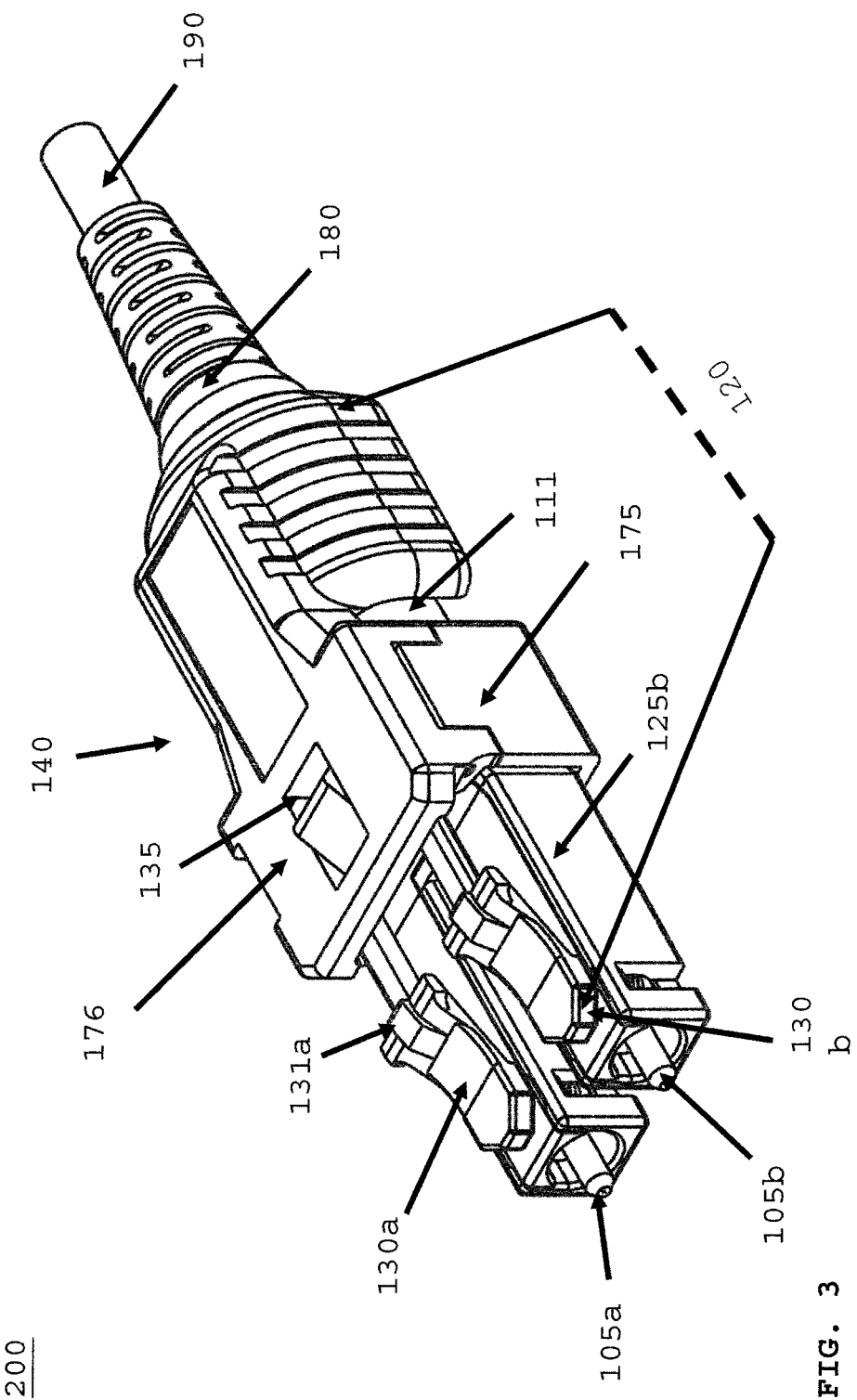
FIG. 3 depicts a perspective view of a connector assembly in a first polarity position according to an embodiment of the present invention.

FIG. 3 depicts a second embodiment of connector assembly 200 without pull-push tab 134. In this second embodiment, connector assembly 200 includes rotatable housing 140 which is integrated as part of second locking member 176 (FIG. 4), and first locking member 175 is hinged to second locking member 176, as described below. Protrusion 145 is either depressed in direction of arrow "PD" as described herein (FIG. 2), or rotatable housing 140 is pulled in a distal direction or toward cable 190 to rotate down adapter latches (131a, 131b) formed as part of connection members (130a, 130b). In operation, pulling on rotatable housing 140 or pushing down protrusion 145 will release connector assembly 200 from a receiver. Protrusion 145 is located within window 135. Ferrule assembly (150a, 150b) are housed within plug frame (125a, 125b) respectively.

Figure 4:
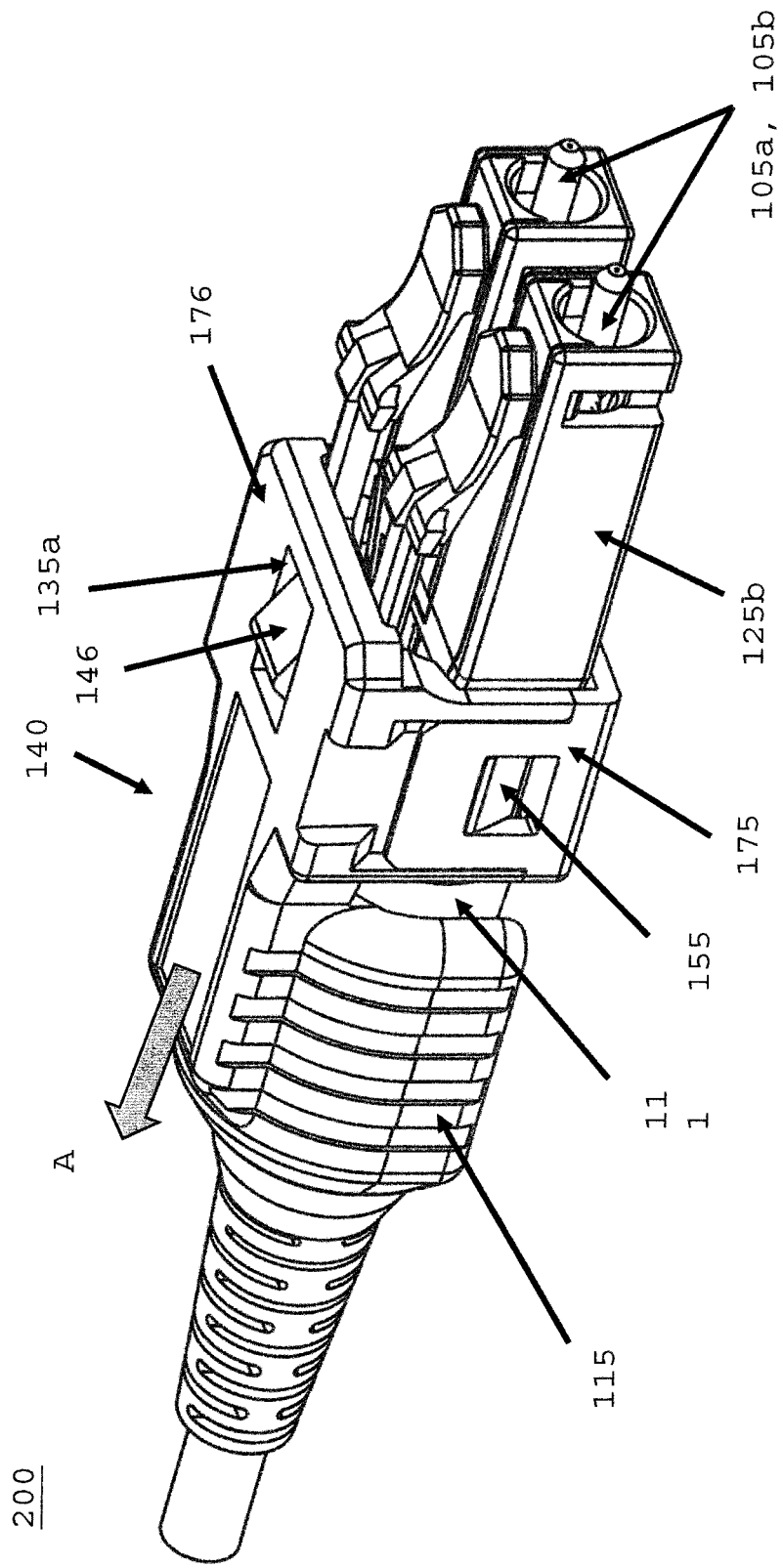
FIG. 4 depicts a perspective opposite view of a connector assembly FIG. 3.

FIG. 4 depicts connector assembly 200 being removed from a receiver (not shown) by pulling rotatable housing 140, in direction of arrow "A". Leading edge 135a of opening 135 (FIG. 3) engages ramp or inclined surface of 146 of protrusion 145. Leading edge 135a forces down protrusion 145 as a user pushes down, in direction of arrow "PD" (refer to FIG. 5). After leading edge 135a depresses protrusion 145, connection members (130a, 130b) rotate down. Thereby releasing the connector from a receiver not shown. User may grip or pull using gripper body portion 115. Gripper body portion 115 rotates about connector housing 110 (FIG. 6) after user unlocks first locking member 175 from second locking member 176 via locking tab 155.

Figure 5:
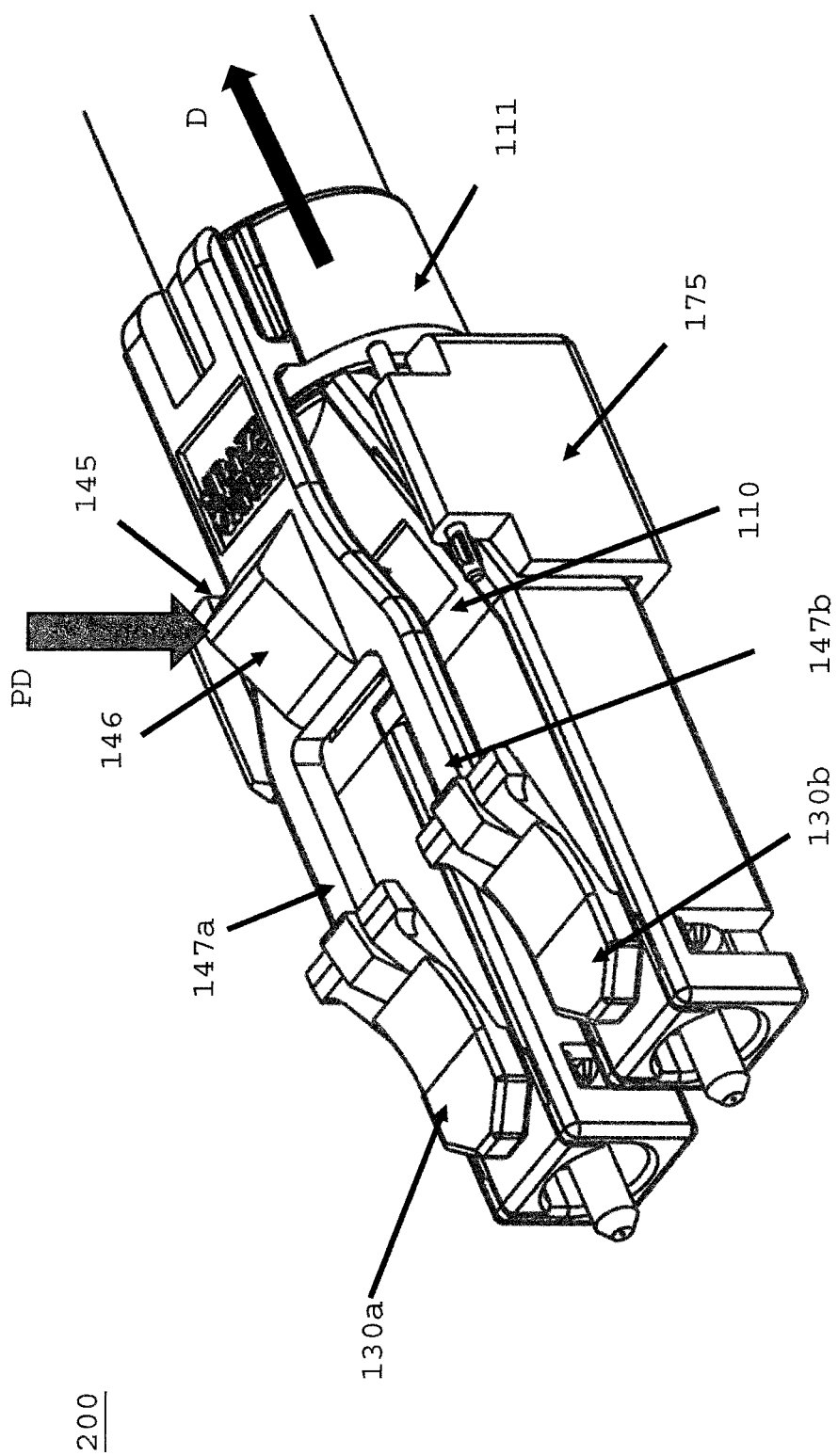
FIG. 5 depicts perspective view FIG. 4 without second locking member as shown in FIG. 4.
Figure 8:
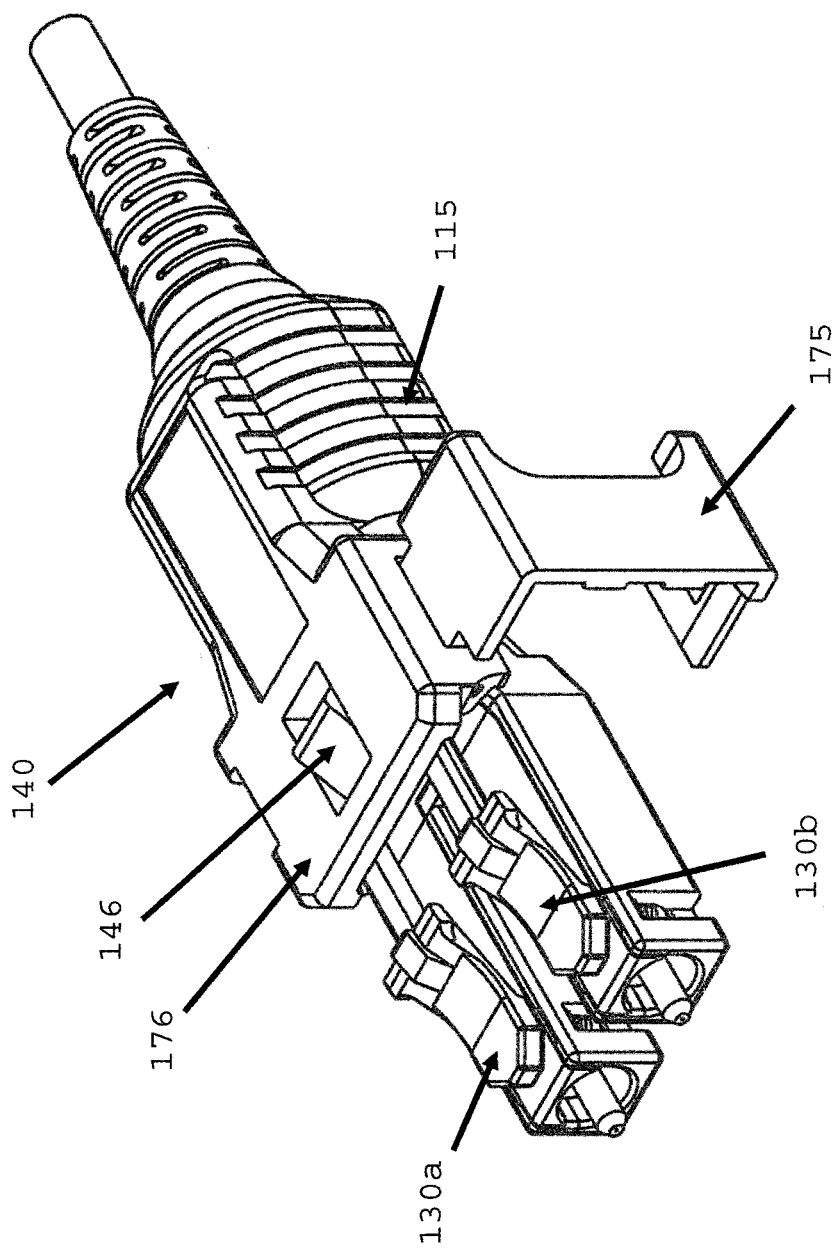
FIG. 8 depicts FIG. 3 with first locking member in an open position.

FIG. 5 depicts connector assembly 200 without gripper body portion 115 or second locking member secured about housing 110. As depicted collar portion 111 is attached to connection member arms (147a, 147b), and when second locking member 176 and first locking member 175 are unhinged (as depicted in FIG. 8), the user may rotate about housing 110 via collar 111 to change the polarity of connector assembly 200. Also to release connector 200 from the receiver, user may pull gripper body portion (not shown) and this moves collar 111 in a distal direction of in direction of arrow "D". Likewise, user may depress protrusion 145 in direction of arrow PD to release connector 200 from the receiver. Upon releasing connector 200, connection members rotate downward as described in FIG. 2.

Figure 6:
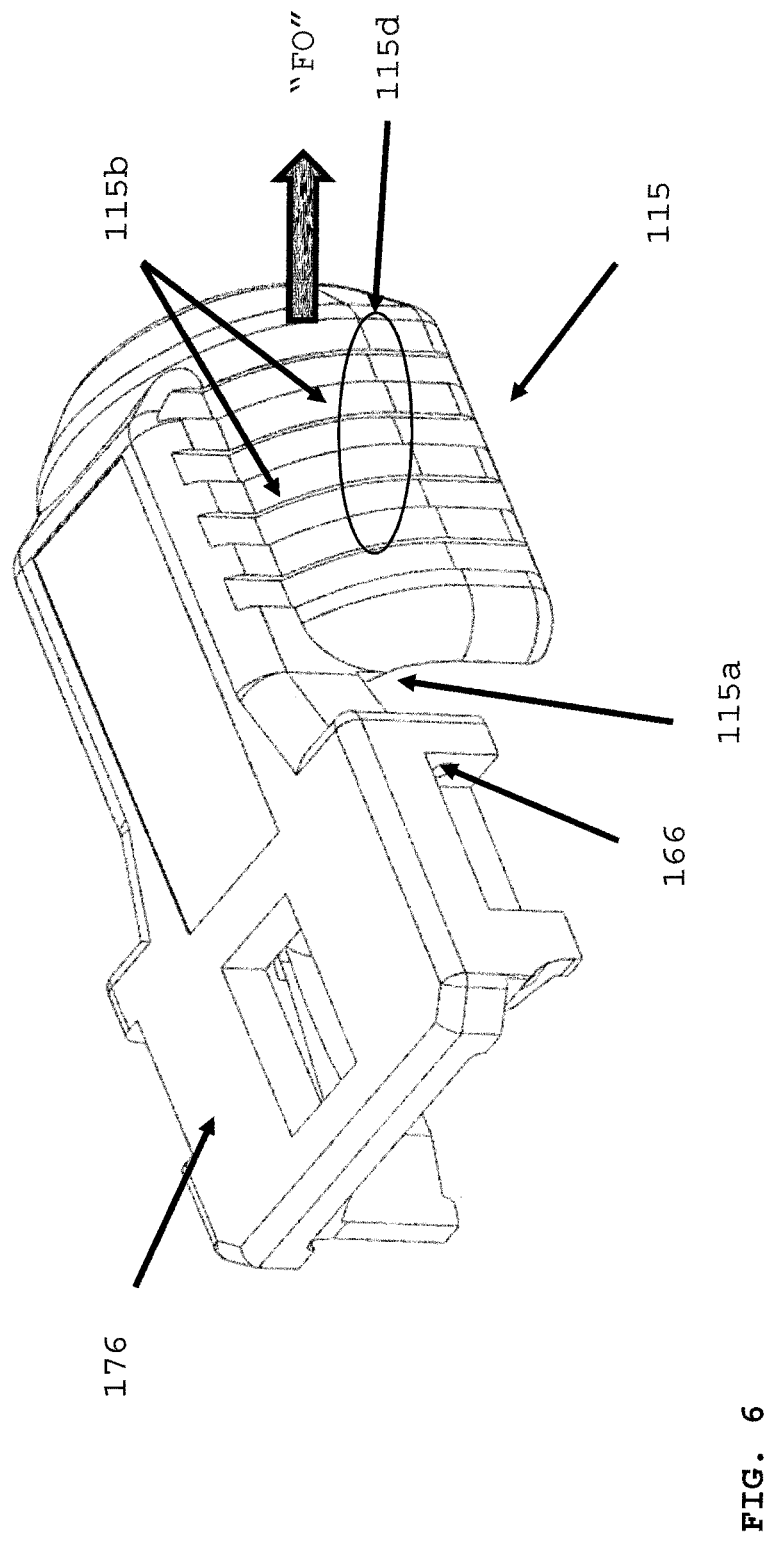
FIG. 6 depicts a perspective view of a second locking member integrated with the rotatable housing.

FIG. 6 depicts rotatable housing 140 that rotates about connector housing 110 as described above. Rotatable housing 115 has a plural of raised surfaces 115a providing gripping area of the user when rotating the housing 115. Rotatable housing 115 has an inner recess 115a. Inner recess 115a is formed of two side portions (115d, 115e). Second side portion 115e, (FIG. 9), together with first side portion forms inner recess 115c, the inner recess is undersized and when the rotatable housing 115 is placed about the collar portion 111, the side portions (115e, 115d) flex outward (as shown by arrow "FO"), then upon the completion of placement, the side portions (115d, 115e) return to their original shape and rotatable housing 115 is secured with collar portion 111 under a press fit of side portions (115e, 115d) against collar portion.

Continuing with FIG. 6, rotating the rotatable housing 115 changes connector (100, 200) from a first polarity to a second polarity, the first polarity is different than the second polarity. Polarity means connector signal Tx for transmit or Rx for read oriented in a first signal path direction that is different from a second signal path direction. This allows connector (100, 200) to be used in a receiver that has the first polarity, and to affect signal communication either the connector or receiver polarity needs to change. In the present invention, this problem is solved when the connector polarity is changed. In most data centers, the adapter is fixed and cannot be changed with substantial cost. Pin retention recess 166 accepts hinge 165 (FIG. 7B) formed as part of second locking member.

Figure 7:
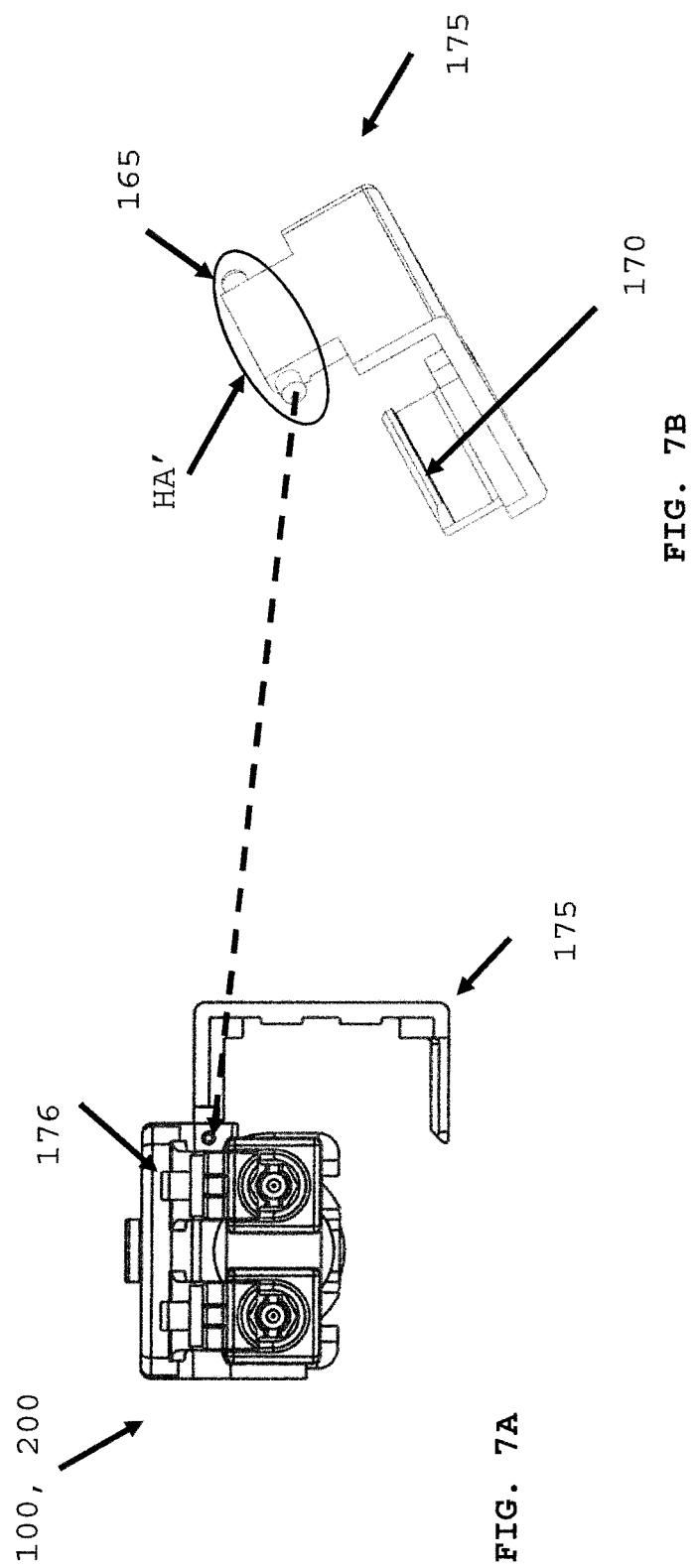
FIG. 7A depicts a front view of the connector assembly of FIG. 1 with a first-locking member not hinged according to an embodiment of the invention.
FIG. 7B depicts a perspective view of first-locking member.

FIG. 7A depicts hinge 165 that pivotably connects second locking member 176 of rotatable housing 140 (FIG. 6) to first locking member 175 such that the first locking member pivots relative to the rotatable body about a hinge axis HA' between the locked and unlocked positions, via locking tab 155 (FIG. 4). Hinge 165 is configured so that the hinge axis HA' is oriented generally parallel to the axis of rotation "R" (FIG. 9) (e.g., the hinge axis HA' extends generally lengthwise of the connector 200, in a front-to-rear direction of the connector assembly, etc.). In the illustrated embodiment, hinge 165 is formed along a hinge side of rotatable housing 140 can also be used as the manipulator assembly. In this embodiment, rotatable housing 140 is a manipulator assembly as it can be used to release connector 200 from a receiver as described above in FIG. 2 and FIG. 5.

FIG. 7B depicts first locking member 175 with hinge 165 and latch hook 170. Hinge 165 is received in recess along hinge access HA' with hinge 165 resides in pin recess 166. Latch Hook 170 is configured to be secured with locking tab 155 (FIG. 9) to secured first locking member 175 with second locking member 176. This prevents unintentional rotation of rotatable housing 140.

Figure 9:
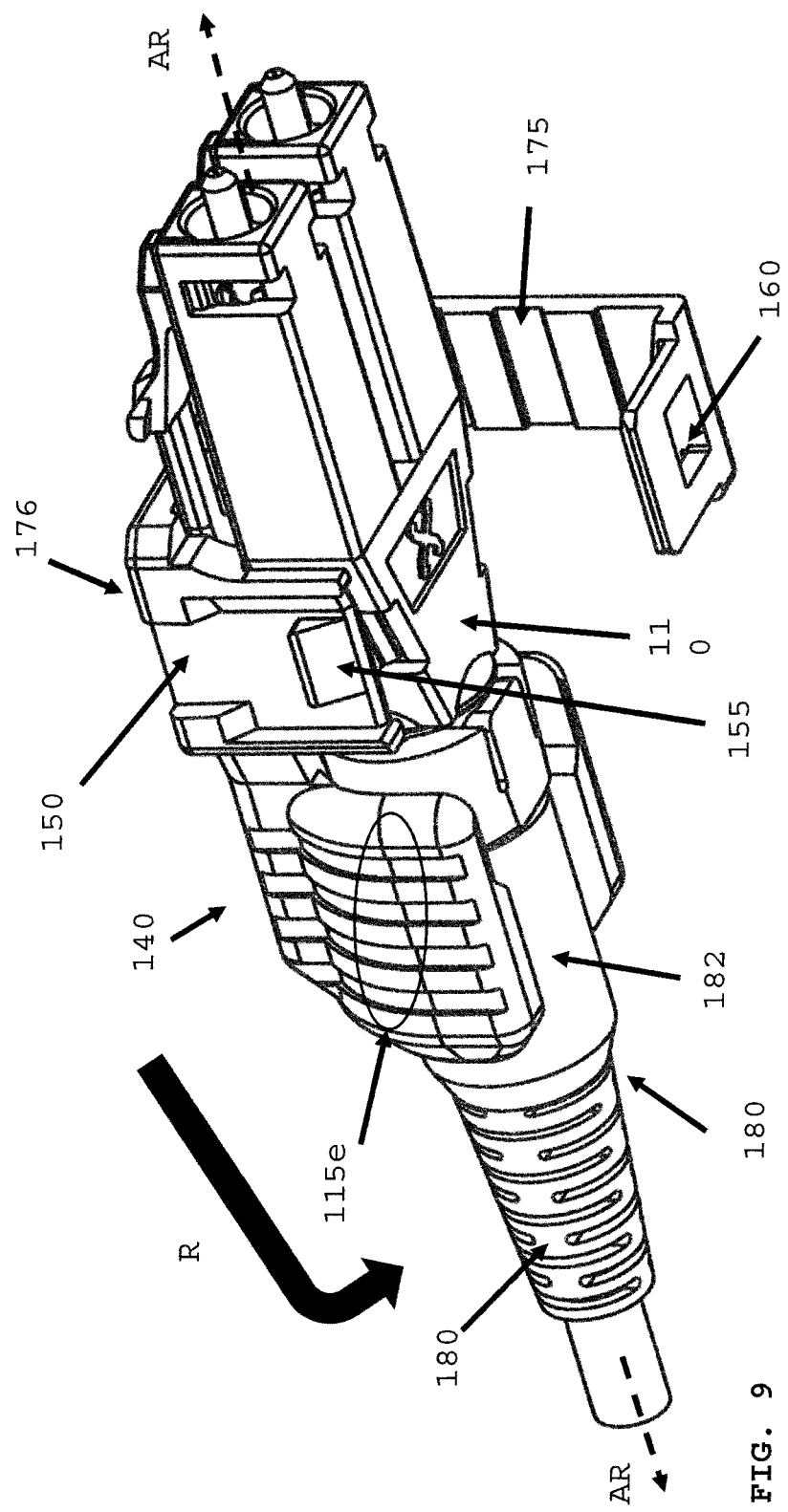
FIG. 9 depicts FIG. 4 with first locking member in an open position.
Figure 10:
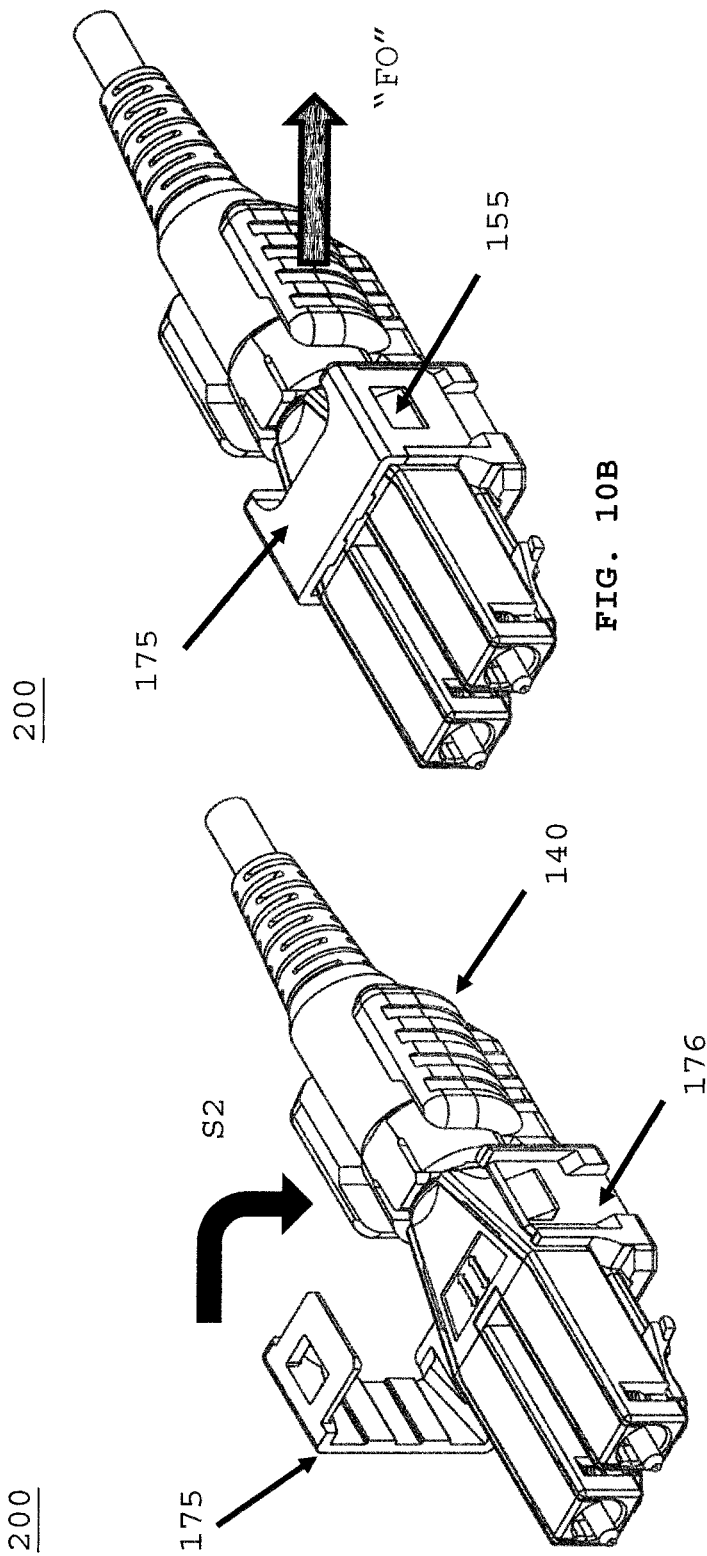
FIG. 10A depicts a bottom view of FIG. 4 with first-locking member in an open position.
FIG. 10B depicts a bottom view of FIG. 4 with first-locking member in a closed position and connector assembly in a second polarity position.

FIG. 8 depicts connector 200 with first locking member 175 hinged to rotatable housing 140 connecting or attaching first locking member 175 to second locking member 176. First locking member 175 is in an open position. Connector 200 is in a first polarity position. FIG. 9 depicts connector 200 in an opposite position to FIG. 8 both in figures in a first polarity position. FIG. 9 further depicts first locking member 175 unhinged from locking tab 155. Locking tab 155 is accepted in opening 160 to secured first locking member 175 with second locking member 176. Side wall 150 is cut into rotatable housing 140 to further secure first locking member with second locking member, and to reduce connector 200 overall width. In FIG. 9, rotatable housing 140 can be rotated in direction of arrow "R" to a second polarity position, as depicted in FIG. 10B. FIG. 9 further depicts flexible cable boot 180 with upper body portion 182 configured to accept and allow rotatable housing 140 to rotate conjointly about an axis of rotation, AR-AR' as show in FIG. 9. Rotatable housing 140 does not extend beyond upper body portion 182. Upper body portion 182 is integrated or formed with flexible cable boot 180.

FIG. 10A depicts connector 200 with first locking member 175 after rotating rotatable housing 140 to second polarity position. First locking member 175 is closed in direction of arrow "S2" into a locked position as depicted in FIG. 10B. FIG. 10B depicts locking tab 155 securing first locking member 175. FIG. 10B further depicts connector 200 in the second polarity position.

Figure 11:
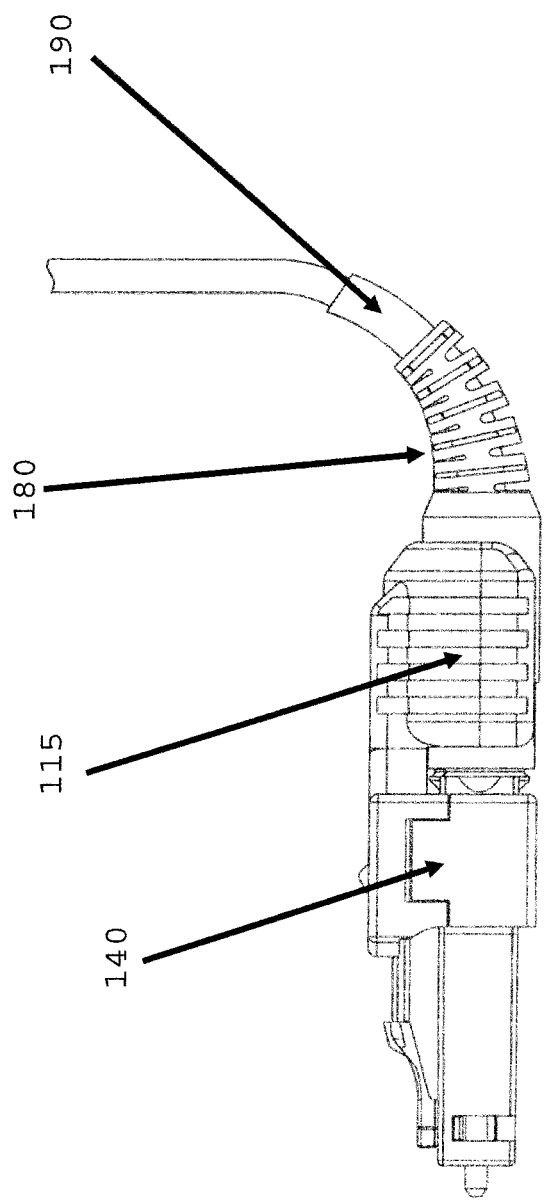
FIG. 11 depicts FIG. 1 tab during movement of flexible boot.

FIG. 11 depicts in any of the connector assemblies discussed above, the connector can comprise rotatable housing 140 having a narrow width. The narrow width and length of rotatable housing 140 allows cable 190 extending from flexible cable boot 180 to be manipulated without interfering with push-pull tab 134 as depicted in FIG. 12.

Although a fiber optic connector has been used as an illustrative embodiment, this detailed description is not so limited, as any type of electrical and/or communication connector may be used according to some embodiments. The connectors, adapters, and connection assemblies formed therefrom may be used in combination with other connection elements and/or materials, such as crimpers, bands, straps, ferrules, locking materials, fluids, gels, or the like.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to").

The invention claimed is:

1. An optical fiber connector comprising:
a ferrule;
a connector housing having a front end portion and a rear end portion, the connector housing being configured to receive the ferrule therein such that the ferrule is exposed through the front end portion of the connector housing for making an optical connection in a receiver;
a connection member that is configured to lockingly engage a locking element of the receiver to lock the optical fiber connector into the receiver, the connection member being rotatably coupled to a manipulator assembly for rotation with respect to the connector housing about an axis of rotation from a first polarity orientation to a second polarity orientation;
the manipulator assembly comprising a rotatable housing and a second locking member;
a first locking member is movable relative to the rotatable housing between a locked position and an unlocked position with the rotatable housing;
the manipulator assembly being coupled to the connection member such that the manipulator assembly and the connection member rotate conjointly about the axis of rotation,
the manipulator assembly further being configured to engage the connector housing to prevent rotation of the manipulator assembly with respect to the connector housing when the first locking member is in the locked position with the second locking member; and
wherein the manipulator assembly can rotate relative to the connector housing about the axis of rotation when the first locking member is in the unlocked position with the second locking member and the fiber connector is removed from the receiver;
wherein the connection member comprises a depressible latch and wherein the manipulator assembly is configured to slide longitudinally along the axis of rotation in relation to the connection member to depress the depressible latch for unlocking the optical fiber connector from the receiver.

2. The optical fiber connector of claim 1, wherein the rotatable housing does not extend beyond a cable boot, thereby no interference of the rotatable housing with a cable extending from the cable assembly.

3. The optical fiber connector of claim 1, wherein the rotatable housing has an open window on the top, the window is configured to receive a protrusion fowled as part of the connection member.

4. The optical fiber connector of claim 1, wherein the connector is in the first polarity orientation when a plurality of locking tabs of the connection member are angularly positioned at the top of the connector housing and the connector is in second polarity orientation when the plurality of locking tabs are angularly positioned at the bottom of the connector housing.

5. The optical fiber connector of claim 3, wherein the protrusion received in the window limits axial or lengthwise movement of the manipulator assembly with respect to the connection member, the protrusion rotates down the connection member when the rotatable housing is moved lengthwise in a distal direction or away from the front end portion, thereby releasing the fiber optic connector from the receiver.

6. A method of changing polarity of a fiber optic connector, comprising:
providing the fiber optic connector according to claim 1;
removing the fiber optic connector from a receiver port;
unlocking the rotatable housing on the fiber optic connector;
rotating the rotatable housing from a first position to a second position;
locking the rotatable housing on the fiber optic connector;

inserting the fiber optic connector into the receiver port; and wherein rotating the rotatable housing from the first position to the second position changed the polarity of the fiber optic connector.

7. An optical fiber connector comprising:

a ferrule;

a connector housing having a front end portion and a rear end portion, the connector housing being configured to receive the ferrule therein such that the ferrule is exposed through the front end portion of the connector housing for making an optical connection in a receiver;

a connection member configured to lockingly engage a locking element of the receiver to lock the optical fiber connector into the receiver, the connection member being rotatably connected to the connector housing for rotation about an axis of rotation with respect to the connector housing from a first polarity orientation to a second polarity orientation;

a manipulator assembly comprising a housing member and a locking member movable relative to the housing member between a locked position and an unlocked position, the manipulator assembly being configured rotate with the connection member about the axis of rotation with respect to the connector housing when the locking member is in the unlocked position, the manipulator assembly further being configured to engage the connector housing to prevent rotation of the manipulator assembly with respect to the connector housing when the locking member is in the locked position;

wherein the connection member comprises a depressible latch and wherein the manipulator assembly is configured to slide longitudinally along the axis in relation to the connection member to depress the depressible latch for unlocking the optical fiber connector from the receiver.

* * * * *

UNITED STATES PATENT AND TRADEMARK OFFICE
CERTIFICATE OF CORRECTION

| | |
|---|---|
| PATENT NO. | : 11,237,342 B2 |
| APPLICATION NO. | : 16/456039 |
| DATED | : February 1, 2022 |
| INVENTOR(S) | : Kenji Iizumi et al. |

It is certified that error appears in the above-identified patent and that said Letters Patent is hereby corrected as shown below:

On the Title Page

Item (73), Assignee, replace:
"Senko Advanced Components, Inc. (Marlborough, MA, US)"
With:
--Senko Advanced Components, Inc. (Marlborough, MA, US)
Sumitomo Electric Industries, Ltd. (Osaka, JP)--

Signed and Sealed this
Fifteenth Day of November, 2022

Katherine Kelly Vidal
*Director of the United States Patent and Trademark Office*